(12) United States Patent
Hunter

(10) Patent No.: US 12,273,657 B2
(45) Date of Patent: Apr. 8, 2025

(54) AUDITING CATV SUBSCRIBER TAPS USING IMAGES

(71) Applicant: Charter Communications Operating, LLC, St. Louis, MO (US)

(72) Inventor: Patrick Phillip Hunter, Saint Charles, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 113 days.

(21) Appl. No.: 18/334,621

(22) Filed: Jun. 14, 2023

(65) Prior Publication Data

US 2024/0422292 A1 Dec. 19, 2024

(51) Int. Cl.
*H04N 7/16* (2011.01)
*B64C 39/02* (2023.01)
*B64U 80/30* (2023.01)
*B64U 101/30* (2023.01)

(52) U.S. Cl.
CPC ........... *H04N 7/162* (2013.01); *B64C 39/024* (2013.01); *B64U 80/30* (2023.01); *B64U 2101/30* (2023.01)

(58) Field of Classification Search
None
See application file for complete search history.

(56) References Cited

U.S. PATENT DOCUMENTS

| | | |
|---|---|---|
| 2005/0076381 A1 | 4/2005 | Gross |
| 2016/0266579 A1 | 9/2016 | Chen et al. |
| 2021/0034843 A1 | 2/2021 | Sivan et al. |

FOREIGN PATENT DOCUMENTS

WO WO-2008097550 A2 * 8/2008 ............. G08B 13/08

OTHER PUBLICATIONS

Author Unknown, "How drones are revolutionizing the telecom industry," TELECOM Review, https://www.telecomreview.com/articles/reports-and-coverage/4190-how-drones-are-revolutionizing-the-telecom-industry, Dec. 4, 2020, 5 pages.

* cited by examiner

*Primary Examiner* — Omar S Parra
(74) *Attorney, Agent, or Firm* — Dority & Manning, P.A.

(57) ABSTRACT

A computing system receives at least one first image of a first device affixed to a structure above ground. The computing system determines that the at least one first image depicts a CATV tap comprising a plurality of coaxial connectors. The computing system determines, based in part on the at least one first image and a set of coaxial cables, each coaxial cable connected to a coaxial connector of the plurality of coaxial connectors, that a use status of the CATV tap is an authorized use status or an unauthorized use status. The computing system performs an action based on the use status.

20 Claims, 5 Drawing Sheets

AUDITING CATV SUBSCRIBER TAPS USING IMAGES

BACKGROUND

Cable television (CATV) system audits are a regular part of CATV system and business maintenance. CATV system audits ensure that the physical cables connected to CATV taps are connected at the other end only to paying subscribers' homes or businesses.

SUMMARY

The examples disclosed herein audit CATV subscriber taps using images by capturing images of CATV taps using drones and determining whether the use of the CATV tap is authorized or unauthorized based on the coaxial cables connected to coaxial connectors of the CATV tap and subscriber information. Machine learning can be used to determine whether the images captured by the drone are images of a CATV tap and which coaxial cables are connected to the coaxial connectors of the CATV tap. A database of subscriber information can also be accessed to determine whether the use of the CATV tap is authorized or unauthorized by the users of the coaxial cables connected to the CATV tap.

In one example, a method for auditing CATV subscriber taps using images is provided. The method includes receiving, by a computing system, at least one first image of a first device affixed to a structure above ground. The method further includes determining, by the computing system, that the at least one first image depicts a CATV tap comprising a plurality of coaxial connectors. The method further includes determining, by the computing system based in part on the at least one first image and a set of coaxial cables, each coaxial cable connected to a coaxial connector of the plurality of coaxial connectors, that a use status of the CATV tap is an authorized use status or an unauthorized use status. The method further includes performing an action based on the use status.

In another example, a computing device for auditing CATV subscriber taps using images is provided. The computing device includes a memory and a processor device coupled to the memory. The processor device is to receive at least one first image of a first device affixed to a structure above ground. The processor device is further to determine that the at least one first image depicts a CATV tap comprising a plurality of coaxial connectors. The processor device is further to determine, based in part on the at least one first image and a set of coaxial cables, each coaxial cable connected to a coaxial connector of the plurality of coaxial connectors, that a use status of the CATV tap is an authorized use status or an unauthorized use status. The processor device is further to perform an action based on the use status.

In another example, a non-transitory computer-readable storage medium for auditing CATV subscriber taps using images is provided. The non-transitory computer-readable storage medium includes computer-executable instructions to cause a processor device to receive at least one first image of a first device affixed to a structure above ground. The instructions further cause the processor device to determine that the at least one first image depicts a CATV tap comprising a plurality of coaxial connectors. The instructions further cause the processor device to determine, based in part on the at least one first image and a set of coaxial cables, each coaxial cable connected to a coaxial connector of the plurality of coaxial connectors, that a use status of the CATV tap is an authorized use status or an unauthorized use status. The instructions further cause the processor device to perform an action based on the use status.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
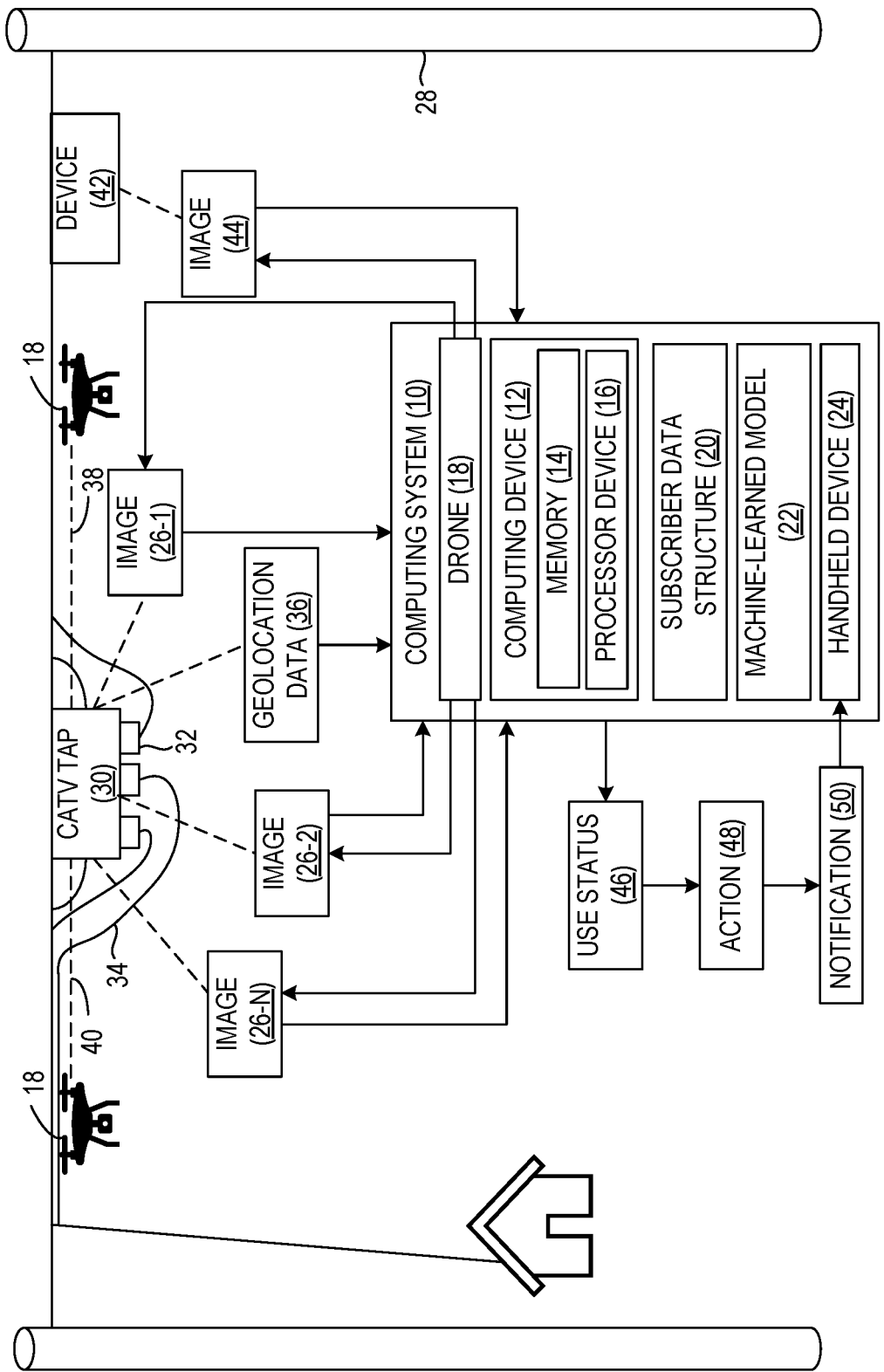
FIG. 1 is a block diagram of a computing system in which examples of auditing CATV subscriber taps using images may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B. The word "data" may be used herein in the singular or plural depending on the context.

CATV system audits ensure that the physical cables connected to CATV taps are connected at the other end only to paying subscribers' homes or businesses. A physical audit can ensure that the physical cables are connected only to a paying subscriber's home or business from the CATV tap. The physical audit is traditionally conducted by technicians who validate each connection at each CATV tap, which requires the technician to be up on a utility pole via ladders, climbers, or utility vehicles equipped with lifts. However, performing a physical audit with a technician in this way can be dangerous for the technician and for property. Alternatively, a technician on the ground can use binoculars or other optical aids, however, such a method is limited in its effectiveness due to the distance and limited angles available for viewing a CATV tap from the ground.

The examples disclosed herein audit CATV subscriber taps using images by capturing images of CATV taps using drones and determining whether the use of the CATV tap is authorized or unauthorized based on the coaxial cables connected to coaxial connectors of the CATV tap and subscriber information. Machine learning can be used to determine whether the images captured by the drone are images of a CATV tap and which coaxial cables are connected to the coaxial connectors of the CATV tap. A database of subscriber information can also be accessed to determine whether the use of the CATV tap is authorized or unauthorized by the users of the coaxial cables connected to the CATV tap. As a result, the CATV system audit can be more accurate and quicker, and can be performed without requiring a human with climbing equipment or binoculars to perform the audit.

A computing system that includes a drone, a machine-learned model, a handheld device, a subscriber database, and one or more computing devices, can be implemented to audit CATV subscriber taps using images captured by the drone. The drone can be activated by a user on the ground using a wireless network connection and the handheld device or autonomously by a computing device of the computing system. The drone can autonomously direct itself within close proximity of a CATV tap by using machine learning and/or geolocation data. The drone can capture multiple images of the CATV tap at multiple different angles and distances.

The machine-learned model may be implemented, such as in a computing device of the computing system, to determine, based on the images captured by the drone, whether the images are images of a CATV tap. The machine-learned model may also be used to determine how many coaxial cables are connected to the coaxial connectors of the CATV tap. The machine-learned model can also be used to determine that the coaxial cables connected to the coaxial connectors of the CATV tap are connected at the other end to a home or business, such as by moving the drone via machine learning, geolocation data, or the handheld device along the coaxial cable from the CATV tap to its endpoint at the home or business.

The audit of the CATV tap (i.e., the determination of whether the use of the CATV tap is authorized or unauthorized) can be completed by accessing the subscriber database to retrieve subscription information for the home or business to which the coaxial cables from the CATV tap are connected. Based on the subscription information, the computing system can determine whether the users at the home or business are paying subscribers of the cable service and are thus authorized to use the CATV tap. The audit of the CATV tap can also be completed by accessing the subscriber database to retrieve information about the number of homes or businesses that should be connected to the CATV tap. Based on the expected number of connections and the homes or businesses that are actually connected to the coaxial connectors of the CATV tap, the computing system can determine whether there is an unauthorized use of the CATV tap, such as when the number of actual connections is greater than the number of expected connections. When the audit is complete and the use status is determined to be authorized or unauthorized, the use status can be output to the handheld device or another computing device for display and/or storage.

FIG. 1 is a block diagram of a computing system 10 in which examples of auditing CATV subscriber taps using images may be practiced. The computing system 10 includes a computing device 12 comprising a memory 14 and a processor device 16. Although only the computing device 12 is illustrated with a memory 14 and a processor device 16, any component of the computing system 10 may include one or more memories 14 and/or one or more processor devices 16. The computing system 10 may also include a drone 18, a subscriber data structure 20, a machine-learned model 22, and a handheld device 24. In some implementations, the computing system 10 may include a plurality of drones and/or handheld devices. It is to be understood that the computing system 10 in some examples may include constituent elements in addition to those illustrated in FIG. 1. It is further noted that while the computing device 12, the drone 18, the subscriber data structure 20, the machine-learned model 22, and the handheld device 24 are shown as separate components, in other implementations, the computing device 12, the drone 18, the subscriber data structure 20, the machine-learned model 22, and the handheld device 24 could be implemented in a single component or could be implemented in a greater number of components than five. In examples where the computing system 10 includes a plurality of drones, the functionality implemented by the drone 18 may be attributed to each drone of the plurality of drones. In examples where the computing device 12 comprises software instructions that program the processor device 16 to carry out functionality discussed herein, functionality implemented by the computing device 12 may be attributed herein to the processor device 16.

In the example of FIG. 1, the computing system 10 receives at least one first image 26-1 of a first device that is affixed to a structure above the ground. The structure above the ground may be a utility pole 28 and the first device may be affixed to the utility pole 28 or to one or more cables running between two utility poles, including the utility pole 28. In some implementations, the structure above the ground can be a box structure that houses devices for cable television and communication services, and the first device may be affixed inside the box. The computing system 10 may determine that the at least one first image 26-1 depicts a CATV tap 30. The CATV tap 30 may comprise a plurality of coaxial connectors 32 that are ports on the CATV tap 30 where a coaxial cable 34 can be connected for service for cable television from a cable provider.

The computing system 10 may cause the drone 18 to capture at least one image of the first device affixed to the structure above the ground. The drone 18 may include one or more sensors for detecting where objects are in relation to the drone 18 in order for the drone 18 to avoid hitting objects and structures above ground, such as the utility pole 28 and the cables running between the utility poles, while the drone 18 is airborne. The drone 18 may additionally include propeller guards to prevent damage to the drone 18, objects, and structures above the ground, such as the utility pole 28 and the cables running between the utility poles, while the drone 18 is airborne. The drone 18 may also include one or more cameras that can capture images in various resolutions in color or black and white. The drone 18 can capture the at least one first image 26-1 of the CATV tap 30. In some implementations, the computing system 10 may cause a plurality of drones to each capture at least one image of the first device affixed to the structure above the ground, such as the at least one first image 26-1 of the CATV tap 30. In some examples, the drone 18 may be controlled by a user using the handheld device 24 (e.g., a phone, tablet, laptop, or wearable device) and the user can cause the drone 18 to capture images and/or navigate while airborne. The computing system 10 may receive the at least one first image 26-1 of the CATV tap 30 that was captured by the drone 18, such as from the drone 18 or from another computing device of the computing system 10 where the drone 18 sent the at least one first image 26-1 of the CATV tap 30.

In some examples, the computing system 10 may obtain geolocation data 36 that corresponds to the location of the first device. For instance, the geolocation data 36 may be retrieved by the computing system 10 from a database of geolocation information for CATV taps and other devices of a cable provider or based on cable system prints and designs that identify the residences and businesses that should receive cable services from the CATV taps, or the geolocation information may be provided to the computing system 10 by a user, as non-limiting examples. The geolocation data 36 may identify the first device as the CATV tap 30 and the location of the CATV tap 30, such as by latitude and longitude coordinates or an address, as non-limiting examples. Based on the geolocation data 36, the computing system 10 can cause the drone 18 to navigate to the location of the first device, which is the CATV tap 30 as identified in the geolocation data 36. Once the drone 18 is at a location proximate to the CATV tap 30 so that an image can be captured, the computing system 10 may cause the drone 18 to capture at least one image (e.g., the at least one first image 26-1) of the CATV tap 30. In some implementations, based on the geolocation data 36, the computing system 10 can cause a plurality of drones to navigate to the location of the CATV tap 30 identified by the geolocation data 36 and capture the at least one first image 26-1 of the CATV tap 30. The plurality of drones may communicate with each other to capture the at least one first image 26-1 of the CATV tap 30 from different distances, heights, and/or angles.

In other examples, based on the sensors of the drone 18, the computing system 10 may determine a distance between the drone 18 and the first device affixed to the structure above the ground. For instance, the sensors of the drone 18 may sense locations of the utility pole 28, the CATV tap 30, the cables, such as the coaxial cable 34, and other devices affixed to the structure above the ground, and use such location data to determine the distance between the drone 18 and the CATV tap 30. The computing system 10 may also determine that the distance is a length where the drone 18 can capture images of a device affixed to the structure above the ground. For instance, the sensors of the drone 18 may be used to identify where the device affixed to the structure (e.g., the CATV tap 30) and the nearby structures (e.g., the utility pole 28) are located in order for the drone 18 to be positioned away from the other structures and in view of the device. For example, the distance between the drone 18 and the CATV tap 30 may be one meter and the computing system 10 can determine that the drone 18 can capture images of the CATV tap 30 without interfering with nearby structures at the one-meter distance. Once the drone 18 is at the location, the computing system 10 can cause the drone 18 to capture the at least one image of the first device (e.g., the CATV tap 30) affixed to the structure above the ground.

In another example, the drone 18 may capture a first image of the first device affixed to the structure above the ground from a first location 38 proximate to the first device affixed to the structure above the ground. The computing system 10 may cause the drone 18 to move from the first location 38 to a second location 40 proximate to the first device affixed to the structure above the ground. For instance, the second location 40 may be at a different angle, a different height, and/or a different distance from the first device than the first location 38. The drone 18 may then capture a second image 26-2 of the first device affixed to the structure above the ground from the second location 40. In implementations where the drone 18 is a drone from among a plurality of drones, a first drone (e.g., the drone 18) may capture the first image of the first device affixed to the structure above the ground from the first location 38 and a second drone may capture the second image 26-2 of the first device affixed to the structure above the ground from the second location 40.

The first image and the second image 26-2 may be included in the at least one first image of the first device that the computing system 10 receives. For example, the drone 18 may capture a first image of the CATV tap 30 from the first location 38 proximate to the CATV tap 30 and a second image of the CATV tap 30 from the second location 40 proximate to the CATV tap 30. The computing system 10 may receive the first image of the CATV tap 30 and the second image 26-2 of the CATV tap 30 from the drone 18 or from another computing device of the computing system 10, such as a server, where the drone 18 sent the first image and the second image.

In some implementations, the computing system 10 may cause the drone 18 to move from the second location 40 to a third location that is proximate to the first device affixed to the structure above the ground and at a different angle, height, and/or distance than the first location 38 and the second location 40, and capture a third image of the first device, which may be included with the first image and the second image in the at least one first image of the first device that the computing system 10 receives. In implementations where the drone 18 is a drone from among a plurality of drones, a first drone (e.g., the drone 18) may capture the first image of the first device affixed to the structure above the ground from the first location 38, a second drone may capture the second image 26-2 of the first device affixed to the structure above the ground from the second location 40, and a third drone may capture the third image of the first device at the third location.

Subsequent to causing the drone 18 to capture the at least one image of the first device affixed to the structure above the ground, the computing system 10 may determine, based on the at least one image, that the first device affixed to the structure above the ground is not a CATV tap. For instance, the first device may be a signal amplifier or a transformer, or the image may not be of a quality for the computing system 10 to be able to determine whether the image depicts a CATV tap, such as when the coaxial cables connected to the plurality of coaxial connectors 32 are tangled. The computing system 10 may determine that the first device is not a CATV tap by using the machine-learned model 22, which has been trained on images of CATV taps and other devices that can be affixed to the structure above ground, and the at least one image captured by the drone 18. The computing system 10 may cause a display device, such as the handheld device 24, to display information indicating that the first device is not a CATV tap, and a user can interact with the display device to cause the drone 18 to capture more images. The computing system 10 may cause the drone 18 to move to a location proximate to the first device affixed to the structure. For example, the drone 18 may have captured an image of the first device affixed to the structure above the ground at the first location 38, the computing system 10 may have determined that the first device is not a CATV tap, and the computing system 10 may cause the drone 18 to move to the second location 40. The second location 40 may be at a different distance, angle, and/or height from the first location 38 in order to allow the drone 18 to capture an image of the first device affixed to the structure above the ground. In some examples, the display device (e.g., the handheld device 24) may display information indicating that the first device is not a CATV tap and the user can interact with the display device and/or the drone 18 to direct the drone 18 to another location proximate to the first device, such as to the second location 40. The drone 18 may capture a second image of the first device affixed to the structure above the ground at the second location 40. The computing system 10 may determine, based on the second image, that the first device affixed to the structure above the ground is a CATV tap (e.g., the CATV tap 30). The computing system 10 may determine that the first device is a CATV tap by using the machine-learned model 22 and the second image captured by the drone 18. The second image may be included in the at least one first image of the first device that the computing system 10 receives.

In another example, the computing system 10 may cause the drone 18 to move to a location further away from the first device affixed to the structure, such as when the first device 42 is a signal amplifier, a transformer, or another device affixed to the structure above the ground. For instance, the computing system 10 may determine that the first image depicts a signal amplifier (e.g., device 42), such as by using the machine-learned model 22 that has been trained on images that include CATV taps and other devices that can be affixed to a structure above ground, and cause the drone 18 to move towards another device affixed to the structure above the ground, such as based on geolocation data that indicates that the device is a CATV tap. The drone 18 may then capture a second image 44 of a second device affixed to the structure above the ground. The computing system 10 may receive the second image 44 and determine, based on the second image 44, that the second device is the CATV tap 30. The computing system 10 may determine that the second device is the CATV tap 30 by using the machine-learned model 22 and the second image 44 captured by the drone 18. The second image 44 may be included in the at least one first image 26-1 of the first device that the computing system 10 receives.

The computing system 10 may determine that the at least one first image 26-1 depicts a CATV tap 30 by determining, based on the machine-learned model 22, that the at least one first image 26-1 depicts the CATV tap 30. The machine-learned model 22 may be trained on images of CATV taps with and without coaxial cables connected to the coaxial connectors and in different locations and angles, as well as images captured by the drone 18 during prior uses for auditing CATV subscriber taps, in order to train the machine-learned model 22 to identify a CATV tap affixed to a structure above ground, such as the utility pole 28, box, or cables between the utility poles. The machine-learned model 22 may also be trained on images of signal amplifiers, transformers, and other devices that may be affixed to structures above ground in order for the machine-learned model 22 to be able to identify when a device affixed to a structure above the ground is not a CATV tap. In some examples, the computing system 10, based on the machine-learned model 22, may determine that a device affixed to the structure above ground is likely a CATV tap and the computing system 10 may cause the drone 18 to move closer to the device, where the computing system 10 can capture the at least one first image 26-1 and determine that the at least one first image 26-1 depicts the CATV tap 30 based on the machine-learned model 22. The computing system 10 may cause a display device, such as the handheld device 24, to display information indicating that the at least one first image 26-1 depicts the CATV tap 30.

The computing system 10 may determine that a use status 46 of the CATV tap 30 is an authorized use status or an unauthorized use status. The computing system 10 may determine the use status 46 of the CATV tap 30 based at least in part on the at least one first image 26-1 and a set of coaxial cables. Each coaxial cable of the set of coaxial cables (e.g., the coaxial cable 34) is connected to a coaxial connector of the plurality of coaxial connectors 32 of the CATV tap 30. In some implementations, the computing system 10 may send the at least one first image 26-1 of the CATV tap 30 to a display device (e.g., the handheld device 24) for a user to confirm whether the use status 46 of the CATV tap 30 is an authorized use status or an unauthorized use status.

Subsequent to determining that the at least one first image 26-1 depicts the CATV tap 30, the computing system 10 may cause the drone 18 to move to a plurality of different locations (e.g., the first location 38, the second location 40) with respect to the CATV tap 30. For instance, the plurality of different locations may be locations that differ in distances, heights, and angles with respect to the CATV tap 30. The drone 18 may capture, at each location of the plurality of different locations, a corresponding second image of the CATV tap 30 to generate a plurality of second images 26-N. In some implementations, the computing system 10 may cause a plurality of drones to move to a plurality of different locations with respect to the CATV tap 30 and each drone may capture a corresponding second image of the CATV tap 30 to generate the plurality of second images 26-N. Each drone of the plurality of drones may move to a different location of the plurality of different locations in order to capture images of the CATV tap 30 from different distances, heights, and/or angles. The plurality of drones may communicate with each other in order to each capture images of the CATV tap 30 from different distances, heights, and/or angles. The computing system 10 may determine that a use status 46 of the CATV tap 30 is an authorized use status or an unauthorized use status based at least in part on the plurality of second images 26-N and the set of coaxial cables.

The computing system 10 may perform an action 48 based on the use status 46 of the CATV tap 30. In some implementations, the action 48 may be for the computing system 10 to cause a notification 50 to be displayed on a display device. The notification 50 may be based on the use status 46, such as a notification that indicates that the use status 46 of the CATV tap 30 is an authorized use or an unauthorized use. The display device may be the handheld device 24 or another device of the computing system 10, such as a phone, tablet, laptop, computer, or wearable device, as non-limiting examples, that can display the notification 50. In another example, the action 48 may be to flag that there is an incorrect connection to the CATV tap 30 and that the use status 46 of the CATV tap 30 is an unauthorized use. In another example, the action 48 may be to store the use status 46 of the CATV tap 30 in the computing device 12 or another component, such as a storage device or database, of the computing system 10.

Figure 2:
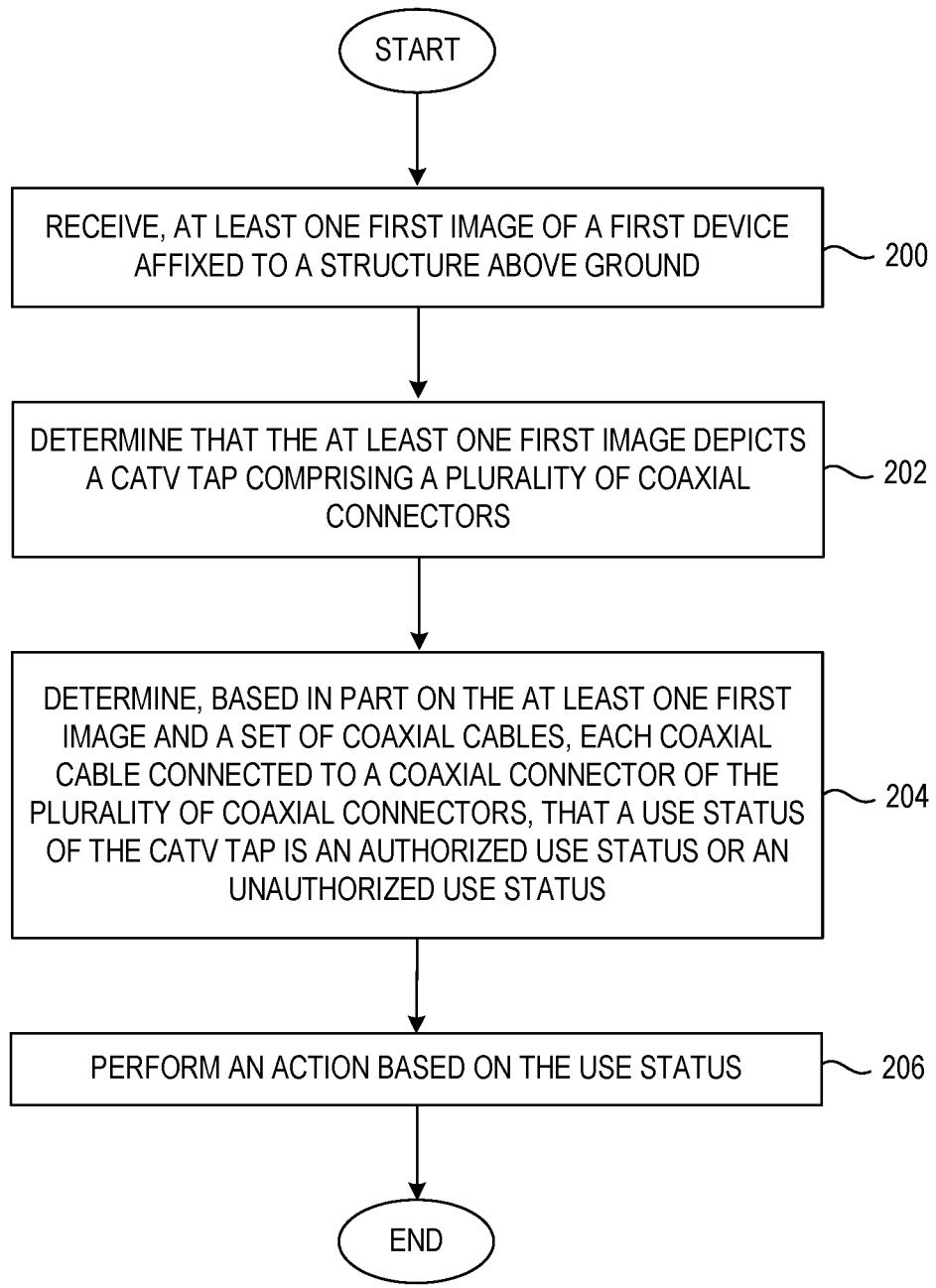
FIG. 2 is a flowchart illustrating operations performed by the computing device of FIG. 1 for auditing CATV subscriber taps using images, according to one example.

FIG. 2 is a flowchart illustrating operations performed by the computing system of FIG. 1 for auditing CATV subscriber taps using images, according to one example. Elements of FIG. 1 are referenced in describing FIG. 2 for the sake of clarity. In FIG. 2, the computing system 10 receives at least one first image 26-1 of a first device affixed to a structure above ground (block 200). The computing system 10 determines that the at least one first image 26-1 depicts a CATV tap 30 comprising a plurality of coaxial connectors 32 (block 202). The computing system 10 determines, based in part on the at least one first image 26-1 and a set of coaxial cables, each coaxial cable connected to a coaxial connector of the plurality of coaxial connectors, that a use status 46 of the CATV tap 30 is an authorized use status or an unauthorized use status (block 204). The computing system 10 performs an action 48 based on the use status 46 (block 206).

Figure 3:
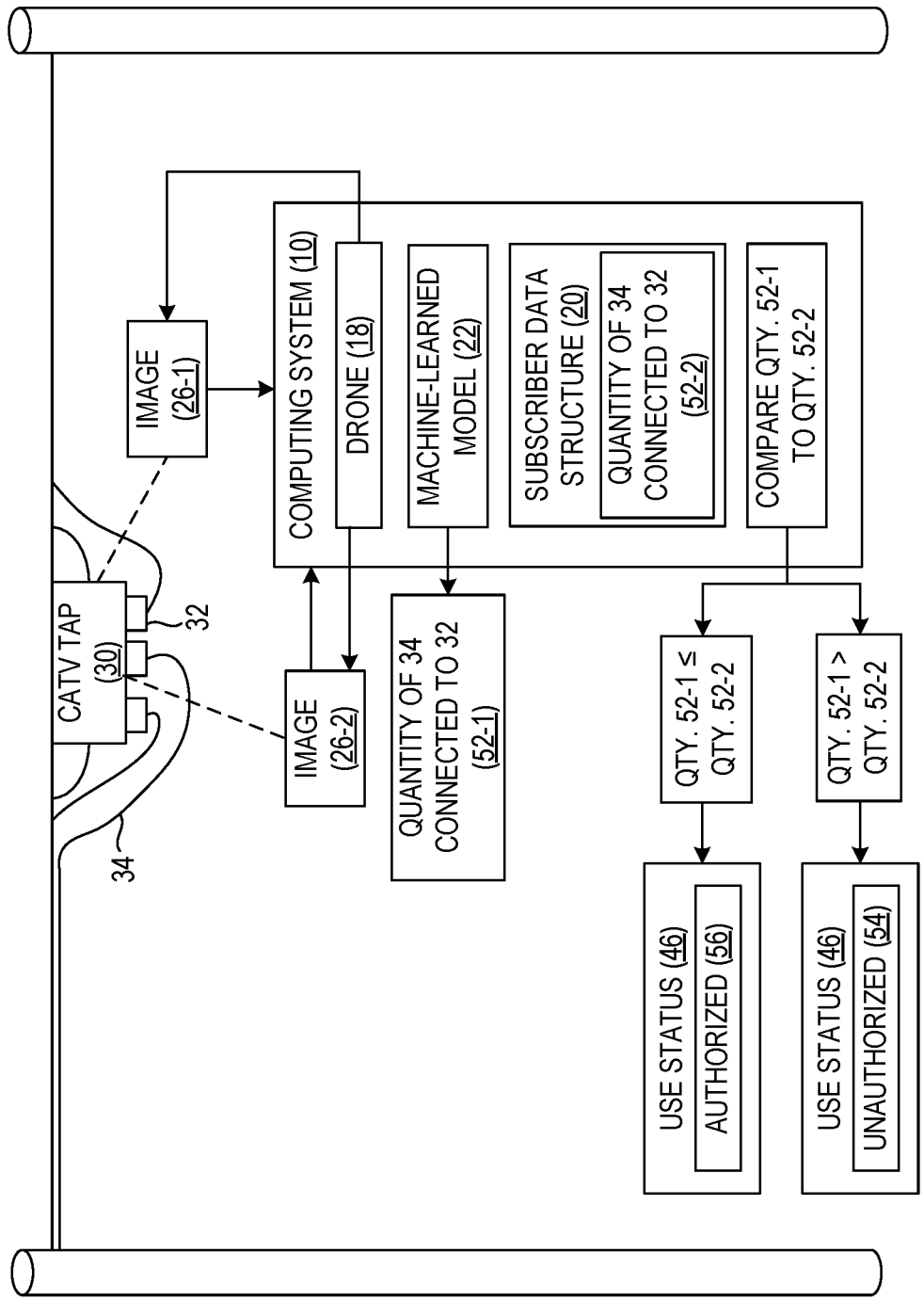
FIG. 3 is a block diagram of the computing system of FIG. 1 for auditing CATV subscriber taps using images, according to one example.

FIG. 3 is a block diagram of the computing system of FIG. 1 for auditing CATV subscriber taps using images, according to one example. Elements of FIG. 1 are referenced in describing FIG. 3 for the sake of clarity. In the example of FIG. 3, the computing system 10 may determine the use status 46 of the CATV tap 30 by determining, based on the at least one first image 26-1, that a first quantity 52-1 of coaxial cables are connected to the plurality of coaxial connectors 32 of the CATV tap 30. In some implementations, the computing system 10 may determine that the first quantity 52-1 of coaxial cables are connected to the plurality of coaxial connectors 32 by receiving the at least one first image 26-1 and determining, based on the machine-learned model 22, that the first quantity 52-1 of coaxial cables are connected to the plurality of coaxial connectors 32 of the CATV tap 30.

The computing system 10 may then access the subscriber data structure 20. The subscriber data structure 20 may be a database with information about the residences or businesses that are paying subscribers for the cable service supplied via the CATV tap 30, as one non-limiting example. For instance, the subscriber data structure 20 may identify residences and businesses that can receive cable services from an identified CATV tap (e.g., the CATV tap 30). The subscriber data structure 20 may identify a second quantity 52-2 of coaxial cables as being connected to the plurality of coaxial connectors 32 of the CATV tap 30. The second quantity 52-2 of coaxial cables may be based on the quantity of residences or businesses that are identified in the subscriber data structure 20 as being connected for cable service from the CATV tap 30. In some examples, the second quantity 52-2 of coaxial cables may be based on the quantity of residences or businesses that are identified in the cable system prints and designs that identify residences and businesses that should receive cable services from the CATV tap 30. The second quantity 52-2 of coaxial cables is the quantity of coaxial cables that the cable provider expects to be connected to the plurality of coaxial connectors 32 of the CATV tap 30, while the first quantity 52-1 of coaxial cables is the quantity of coaxial cables that are actually connected to the plurality of coaxial connectors 32 of the CATV tap 30.

The computing system 10 can compare the first quantity 52-1 of coaxial cables, which are connected to the plurality of coaxial connectors 32 of the CATV tap 30, and the second quantity 52-2 of coaxial cables, which are expected as being connected to the plurality of coaxial connectors 32 of the CATV tap 30. The computing system 10 may determine that the first quantity 52-1 is greater than the second quantity 52-2 based on the comparison of the first quantity 52-1 and the second quantity 52-2. The computing system 10 may determine that the use status 46 of the CATV tap 30 is an unauthorized use status 54 because the first quantity 52-1 (i.e., the quantity of coaxial cables that are actually connected to the plurality of coaxial connectors 32 of the CATV tap 30) is greater than the second quantity 52-2 (i.e., the quantity of coaxial cables that the cable provider expects to be connected to the plurality of coaxial connectors 32 of the CATV tap 30), so there are more coaxial cables connected to the plurality of coaxial connectors 32 of the CATV tap 30 than the cable provider expects to be connected. The computing system 10 may determine that the first quantity 52-1 is equal to or less than the second quantity 52-2 based on the comparison between the first quantity 52-1 and the second quantity 52-2. The computing system 10 may determine that the use status 46 of the CATV tap 30 is an authorized use status 56 because the first quantity 52-1 is equal to or less than the second quantity 52-2, so there are the same amount of coaxial cables or less coaxial cables connected to the plurality of coaxial connectors 32 of the CATV tap 30 than the cable provider expects to be connected.

Figure 4:
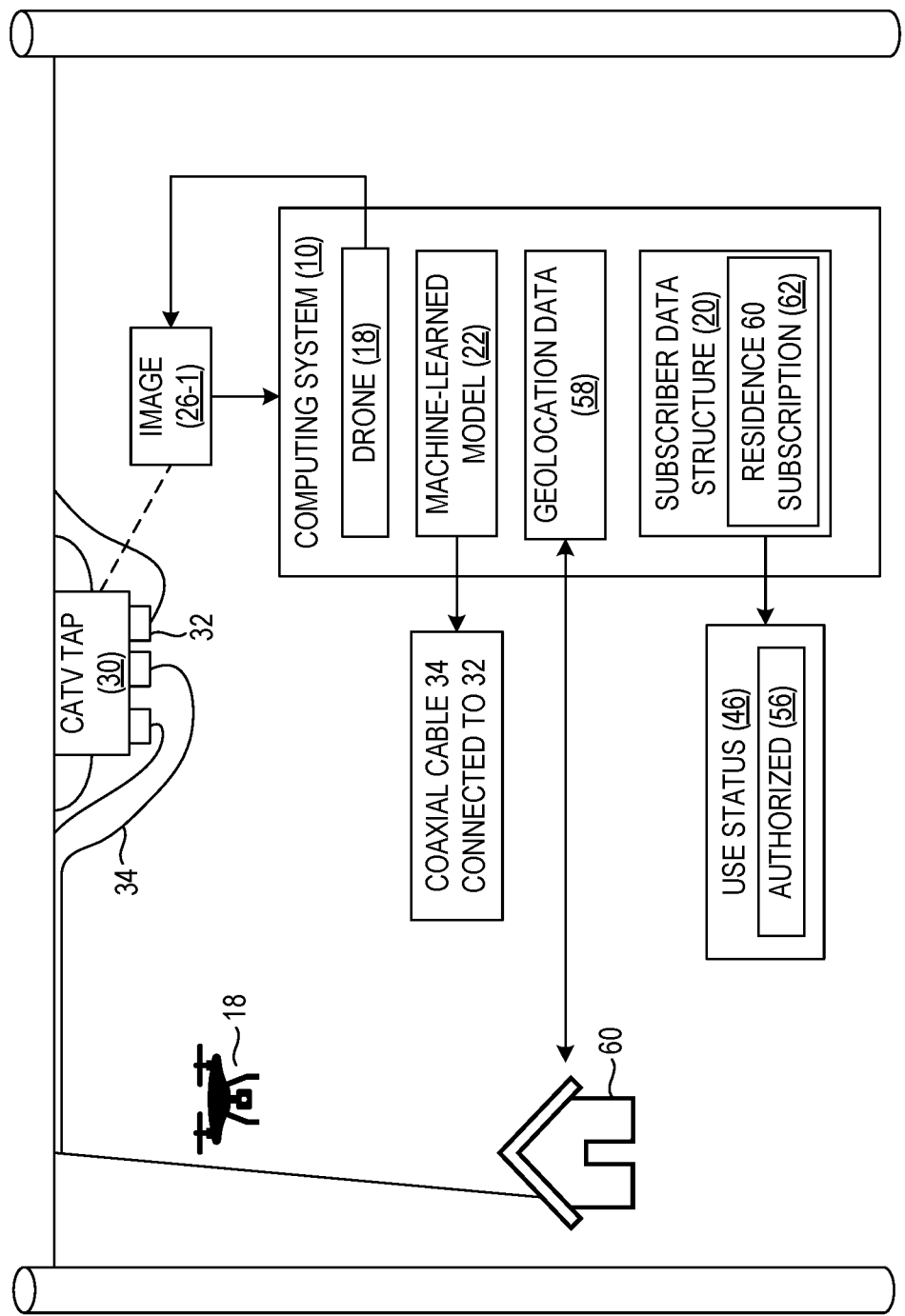
FIG. 4 is a block diagram of the computing system of FIG. 1 for auditing CATV subscriber taps using images, according to one example.

FIG. 4 is a block diagram of the computing system of FIG. 1 for auditing CATV subscriber taps using images, according to one example. Elements of FIG. 1 are referenced in describing FIG. 4 for the sake of clarity. In the example of FIG. 4, the computing system 10 may determine the use status 46 of the CATV tap 30 by causing the drone 18 to follow a coaxial cable from among the coaxial cables (e.g., the coaxial cable 34) from the CATV tap 30. In some examples, the computing system 10 may obtain geolocation data 58 corresponding to a location of a residence 60 or a business and cause the drone 18 to navigate to the location of the residence 60 or business based on the geolocation data 58. For instance, the geolocation data 58 may be retrieved by the computing system 10 from a database of geolocation information for the CATV taps or the geolocation information may be provided to the computing system 10 by a user, as non-limiting examples. In some examples, the geolocation data 58 may be retrieved by the computing system 10 from the subscriber data structure 20. For instance, the subscriber data structure 20 may include addresses or latitude and longitude coordinates of the residences and businesses identified as being able to receive cable services from the CATV tap 30. In another example, the geolocation data 58 may be based on the cable system prints and designs and related metadata that identifies the residences and businesses that should receive cable services from the CATV tap 30, as non-limiting examples. In another example, the drone 18 may continuously capture images of the coaxial cables connected to the plurality of coaxial connectors 32 as the drone 18 travels and use the machine-learned model 22 to determine the direction of the coaxial cables based on the images. The computing system 10 may cause the drone 18 to navigate along the path of the coaxial cables captured in the images until the drone 18 reaches the residence 60 or business.

The computing system 10 may cause the drone to capture images of the residence 60 or business at the location where the coaxial cable 34 is connected to the residence 60 or business. The computing system 10 may determine that the coaxial cable 34 is connected to the residence 60 or business based on the machine-learned model 22 and the images of the residence 60 or business at the location where the coaxial cable 34 is connected. The machine-learned model 22 may be trained on images of coaxial cables that are connected to or not connected to residences and other buildings. The machine-learned model 22 may also be used to determine the address or the latitude and longitude coordinates of the residence 60 or business. In some examples, the computing system 10 may determine that the coaxial cable 34 is incorrectly connected to the residence 60 or business based on the machine-learned model 22 and the images of the residence 60 or business at the location where the coaxial cable is connected. The action 48 performed by the computing system 10 may be to flag the address or location (e.g., latitude and longitude coordinates) of the residence 60 or business as being incorrectly connected, to include the address or location of the residence 60 or business and a message that the coaxial cable 34 is incorrectly connected in the notification 50 displayed on the display device, or to store such information in a component of the computing system 10, as non-limiting examples.

The computing system 10 may then retrieve subscriber information 62 for the residence 60 or business from the subscriber data structure 20. The subscriber data structure 20 may be a database with information about the residences or businesses that are paying subscribers for the cable service supplied via the CATV tap 30, as one non-limiting example. The computing system 10 may determine that the use status 46 of the CATV tap 30 is an authorized use status 56 or an unauthorized use status 54 based on the subscriber information 62 for the residence 60 or business retrieved from the subscriber data structure 20. For example, the computing system 10 can use the address or the latitude and longitude coordinates of the residence 60 or business to retrieve information from the subscriber data structure 20. The address or coordinates of the residence 60 or business may be obtained by the computing system 10 via the geolocation data 58 or the machine-learned model 22, as non-limiting examples.

The information from the subscriber data structure 20 may identify the residence 60 or business as a cable television subscriber and the use status 46 of the CATV tap 30 may thus be an authorized use status 56. For example, the subscriber data structure 20 may be a database and the computing system 10 may use the address or the latitude and longitude coordinates of the residence 60 or business to retrieve a record that contains subscription information for the residence 60 or business. If a record is retrieved from the database and the record identifies the residence 60 or business as a current paying subscriber, then the use status 46 of the CATV tap 30 may thus be an authorized use status 56. If a record is retrieved from the database and the record identifies the residence 60 or business as an expired or non-paying subscriber or if no record is returned from the database, then use status 46 of the CATV tap 30 may thus be an unauthorized use status 54. The notification 50 displayed on the display device may include the address or location (e.g., latitude and longitude coordinates) of the residence 60 or business and the use status 46 (e.g., the authorized use status 56 or the unauthorized use status 54). The use status 46 and the address or location of the residence 60 or business can be stored in a component of the computing system 10, such as the computing device 12, a server, or a database, as non-limiting examples.

Figure 5:
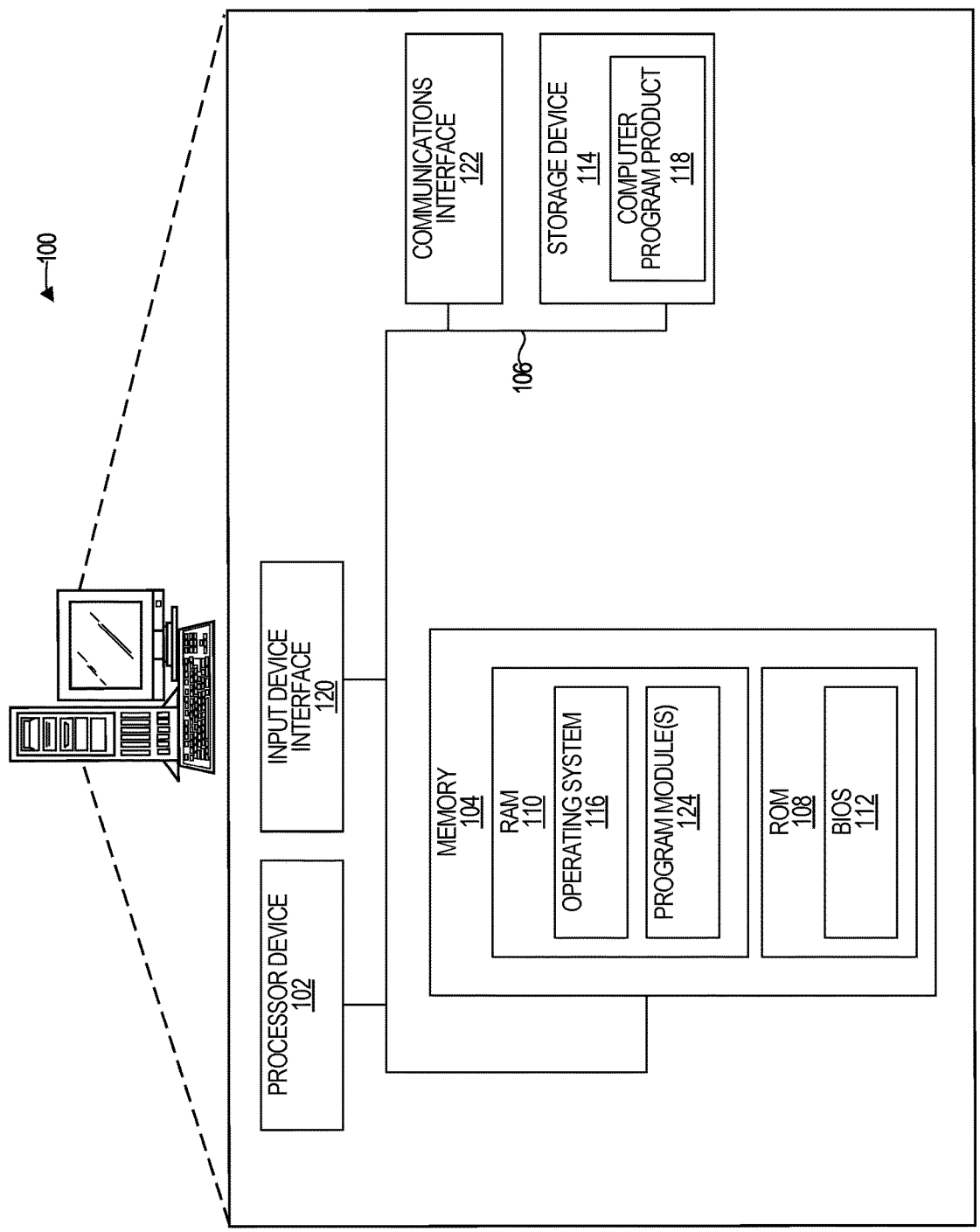
FIG. 5 is a block diagram of a computing device suitable for implementing examples, according to one example.

FIG. 5 is a block diagram of a computing device 100, such as the computing device 12 of the computing system 10, suitable for implementing examples according to one example. The computing device 100 may comprise any computing or electronic device capable of including firmware, hardware, and/or executing software instructions to implement the functionality described herein. The computing device 100 includes a processor device 102, such as the processor device 16, a system memory 104, such as the memory 14, and a system bus 106. The system bus 106 provides an interface for system components including, but not limited to, the system memory 104 and the processor device 102. The processor device 102 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 104 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help to transfer information between elements within the computing device 100. The volatile memory 110 may also include a high-speed RAM, such as static RAM, for caching data.

The computing device 100 may further include or be coupled to a non-transitory computer-readable storage medium such as a storage device 114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 114 and other drives associated with computer-readable media and computer-usable media may provide non-volatile storage of data, data structures, computer-executable instructions, and the like.

A number of modules can be stored in the storage device 114 and in the volatile memory 110, including an operating system 116 and one or more program modules 124 (e.g., the subscriber data structure 20, the machine-learned model 22) which may implement the functionality described herein in whole or in part. All or a portion of the examples may be implemented as a computer program product 118 stored on a transitory or non-transitory computer-usable or computer-readable storage medium, such as the storage device 114, which includes complex programming instructions, such as complex computer-readable program code, to cause the processor device 102 to carry out the steps described herein. Thus, the computer-readable program code can comprise software instructions for implementing the functionality of the examples described herein when executed on the processor device 102. The processor device 102 may serve as a controller, or control system, for the computing device 100 that is to implement the functionality described herein.

An operator, such as a user, may also be able to enter one or more configuration commands through a keyboard (not illustrated), a pointing device such as a mouse (not illustrated), or a touch-sensitive surface such as a display device (not illustrated). Such input devices may be connected to the processor device 102 through an input device interface 120 that is coupled to the system bus 106 but can be connected by other interfaces such as a parallel port, an Institute of Electrical and Electronic Engineers (IEEE) 1394 serial port, a Universal Serial Bus (USB) port, an IR interface, and the like. The computing device 100 may also include a communications interface 122 suitable for communicating with the network as appropriate or desired. The computing device 100 may also include a video port (not illustrated) configured to interface with the display device (not illustrated), to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a computing system, at least one first image of a first device affixed to a structure above ground;
   determining, by the computing system, that the at least one first image depicts a CATV tap comprising a plurality of coaxial connectors;
   determining, by the computing system based in part on the at least one first image and a set of coaxial cables, each coaxial cable connected to a coaxial connector of the plurality of coaxial connectors, that a use status of the CATV tap is an authorized use status or an unauthorized use status; and
   performing an action based on the use status.

2. The method of claim 1, wherein determining, based in part on the at least one first image and the set of coaxial cables, each coaxial cable connected to a coaxial connector of the plurality of coaxial connectors, that the use status of the CATV tap is an authorized use status or an unauthorized use status comprises:
   determining, by the computing system based on the at least one first image, that a first quantity of coaxial cables are connected to the plurality of coaxial connectors, wherein the set of coaxial cables comprises the first quantity;
   accessing, by the computing system, a subscriber data structure that identifies a second quantity of coaxial cables as being connected to the plurality of coaxial connectors; and
   comparing, by the computing system, the first quantity and the second quantity.

3. The method of claim 2, wherein determining, based on the at least one first image, that the first quantity of coaxial cables are connected to the plurality of coaxial connectors comprises:
   receiving, by the computing system, the at least one first image; and
   determining, based on a machine-learned model of the computing system, that a quantity of coaxial cables are connected to the plurality of coaxial connectors, wherein the quantity is the first quantity.

4. The method of claim 2, further comprising:
   determining, by the computing system based on the comparison of the first quantity and the second quantity, that the first quantity is greater than the second quantity; and
   determining, by the computing system based on the determination that the first quantity is greater than the second quantity, that the use status of the CATV tap is an unauthorized use status.

5. The method of claim 2, further comprising:
   determining, by the computing system based on the comparison of the first quantity and the second quantity, that the first quantity is equal to or less than the second quantity; and
   determining, by the computing system based on the determination that the first quantity is equal to or less than the second quantity, that the use status of the CATV tap is an authorized use status.

6. The method of claim 1, wherein determining, based in part on the at least one first image and the set of coaxial cables, each coaxial cable connected to a coaxial connector of the plurality of coaxial connectors, that the use status of the CATV tap is an authorized use status or an unauthorized use status comprises:
   causing, by the computing system, a drone to follow a coaxial cable from among the set of coaxial cables from the CATV tap;
   determining, based on a machine-learned model of the computing system, that the coaxial cable is connected to a residence;
   retrieving, by the computing system from a subscriber data structure that identifies subscriber information for residences, subscriber information for the residence; and
   determining, by the computing system based on the subscriber information for the residence, that the use status of the CATV tap is an authorized use status or an unauthorized use status.

7. The method of claim 6, wherein causing the drone to follow to the coaxial cable from among the set of coaxial cables from the CATV tap comprises:
   obtaining, by the computing system, geolocation data corresponding to a location of a residence; and
   causing, by the computing system based on the geolocation data, the drone to navigate to the location of the residence.

8. The method of claim 6, further comprising:
   determining, by the computing system based on the subscriber information for the residence, that the residence is a subscriber, wherein the use status of the CATV tap is an authorized use status.

9. The method of claim 1, wherein receiving at least one first image of the first device affixed to a structure above ground comprises:
   causing, by the computing system, a drone to capture at least one image of the first device affixed to the structure above the ground.

10. The method of claim 9, wherein causing the drone to capture the at least one image of the first device affixed to the structure above the ground comprises:
    obtaining, by the computing system, geolocation data corresponding to a location of the first device; and
    causing, by the computing system based on the geolocation data, the drone to navigate to the location of the first device.

11. The method of claim 9, wherein the drone includes a plurality of sensors and wherein causing the drone to capture the at least one image of the first device affixed to the structure above the ground comprises:
    determining, by the computing system based on the plurality of sensors, a distance between the drone and the first device affixed to the structure above the ground; and
    determining, by the computing system, that the distance between the drone and the first device affixed to the structure above the ground is a length where the drone can capture images of a device affixed to the structure above the ground.

12. The method of claim 9, wherein causing the drone to capture the at least one image of the first device affixed to the structure above the ground comprises:
    capturing, by the drone, a first image of the first device affixed to the structure above the ground from a first location proximate to the first device affixed to the structure above the ground;
    causing, by the computing system, the drone to move from the first location to a second location proximate to the first device affixed to the structure above the ground; and
    capturing, by the drone, a second image of the structure above the ground from the second location, wherein the at least one first image of the first device affixed to the structure above the ground comprises the first image and the second image.

13. The method of claim 9, further comprising:
subsequent to causing the drone to capture the at least one image of the first device affixed to the structure above the ground, determining, by the computing system based on the at least one image, that the first device affixed to the structure above ground is not a CATV tap;
causing, by the computing system, the drone to move to a location proximate to the first device affixed to the structure above the ground; and
capturing, by the drone, a second image of the first device affixed to the structure above the ground from the location proximate to the structure above the ground, wherein the at least one image of the first device affixed to the structure above the ground comprises the second image.

14. The method of claim 1, further comprising:
subsequent to determining that the at least one first image depicts the CATV tap, causing, by the computing system, a drone to move to a plurality of different locations with respect to the CATV tap; and
capture, by the drone at each location of the plurality of different locations, a corresponding second image of the CATV tap to generate a plurality of second images;
wherein determining, based in part on the at least one first image and the set of coaxial cables, that the use status of the CATV tap is an authorized use status or an unauthorized use status comprises determining, based at least in part on the plurality of second images and the set of coaxial cables, that the use status of the CATV tap is an authorized use status or an unauthorized use status.

15. The method of claim 1, wherein determining that the at least one first image depicts a CATV tap comprising a plurality of coaxial connectors comprises:
determining, based on a machine-learned model of the computing system, that the at least one first image depicts a CATV tap comprising a plurality of coaxial connectors.

16. The method of claim 1, wherein performing the action based on the use status comprises:
causing, by the computing system, a notification to be displayed on a display device, wherein the notification is based on the use status.

17. A computing device, comprising:
a memory; and
a processor device coupled to the memory, the processor device to:
receive at least one first image of a first device affixed to a structure above ground;
determine that the at least one first image depicts a CATV tap comprising a plurality of coaxial connectors;
determine, based in part on the at least one first image and a set of coaxial cables, each coaxial cable connected to a coaxial connector of the plurality of coaxial connectors, that a use status of the CATV tap is an authorized use status or an unauthorized use status; and
perform an action based on the use status.

18. The computing device of claim 17, wherein to determine, based in part on the at least one first image and the set of coaxial cables, each coaxial cable connected to a coaxial connector of the plurality of coaxial connectors, that the use status of the CATV tap is an authorized use status or an unauthorized use status, the processor device is further to:
determine, based on the at least one first image, that a first quantity of coaxial cables are connected to the plurality of coaxial connectors, wherein the set of coaxial cables comprises the first quantity;
access a subscriber data structure that identifies a second quantity of coaxial cables as being connected to the plurality of coaxial connectors; and
compare the first quantity and the second quantity.

19. The computing device of claim 17, wherein to determine, based in part on the at least one first image and the set of coaxial cables, each coaxial cable connected to a coaxial connector of the plurality of coaxial connectors, that the use status of the CATV tap is an authorized use status or an unauthorized use status, the processor device is further to:
cause a drone to follow a coaxial cable from among the set of coaxial cables from the CATV tap;
determine, based on a machine-learned model, that the coaxial cable is connected to a residence;
retrieve, from a subscriber data structure that identifies subscriber information for residences, subscriber information for the residence; and
determine, based on the subscriber information for the residence, that the use status of the CATV tap is an authorized use status or an unauthorized use status.

20. A non-transitory computer-readable storage medium that includes computer-executable instructions that, when executed, cause one or more processor devices to:
receive at least one first image of a first device affixed to a structure above ground;
determine that the at least one first image depicts a CATV tap comprising a plurality of coaxial connectors;
determine, based in part on the at least one first image and a set of coaxial cables, each coaxial cable connected to a coaxial connector of the plurality of coaxial connectors, that a use status of the CATV tap is an authorized use status or an unauthorized use status; and
perform an action based on the use status.

* * * * *